United States Patent Office 3,647,759
Patented Mar. 7, 1972

3,647,759
RESINOUS REACTION PRODUCT OF ETHYLENE GLYCOL AND DMT ESTERIFIED OXIDATE RESIDUE
John F. Walker, New Castle County, Del., assignor to Hercules Incorporated, Wilmington, Del.
No Drawing. Filed Feb. 4, 1970, Ser. No. 8,696
Int. Cl. C08g 17/08
U.S. Cl. 260—75 R       2 Claims

ABSTRACT OF THE DISCLOSURE

Disclosed is a thermoplastic resin which is the reaction product of ethylene glycol and dimethyl terephthalate esterified oxidate residue. The normally solid embodiments of the resin have utility as binders for air or water laid wood or mineral fiber composites. The normally solid and liquid embodiments have utility as polyol reactants for reaction with polyisocyanate material in the production of polyurethane foams, coatings, and films.

This invention resides in the chemical arts. More particularly, it relates to that branch of organic chemistry having to do with synthetic resins.

This invention, in summary, comprises a new synthetic resin which is the transesterification reaction product of ethylene glycol and DMF esterified oxidate residue.

Dimethyl terephthalate (DMT) is produced commercially by a continuous process in which p-xylene is air oxidized to p-toluic acid, the toluic acid is esterified with methanol to form methyl p-toluate, the latter compound is air oxidized to the monomethyl ester of terephthalic acid, and the monomethyl ester is further esterified with methanol. In the commercial process the air oxidations are carried out simultaneously in one vessel, and the esterifications are performed in another vessel. The reaction mixture that results is then distilled to give a distillate comprising DMT and methyl p-toluate, and a residue. The DMT and methyl p-toluate are separated, and the methyl p-toluate is introduced into the oxidation vessel. Some of the residue is purged from the process, while the remainder of the residue is recycled to the oxidation vessel. The purged residue is herein called DMT esterified oxidate residue.

DMT esterified oxidate residue is a highly complex mixture which up to now has been only partially analyzed. A major portion of the mixture comprises methyl and benzyl esters of biphenyl dicarboxylic and tricarboxylic acids. Usually it also comprises catalyst used to promote the oxidation and the esterification reactions. The residue at 20–25° C. is like tar. The ranges of typical properties of the residue are:

| | |
|---|---|
| Color | Dark brown. |
| Drop softening point | 20 to 70° C. |
| Acid number (ASTM D1639) | 10 to 50. |
| Methoxyl (ASTM D–1166–60) | 10 to 30% by weight. |
| DMT | 0 to 6% by weight. |
| Solubility: | |
| Acetone | Completely soluble, no residue. |
| Butyl acetate | Do. |
| Toluene | Do. |
| Methylene chloride | Do. |
| Kerosene | Completely insoluble. |

The synthetic resin of this invention is made by reacting DMT esterified oxidate residue with a quantity of ethylene glycol in the range extending from that quantity of ethylene glycol equal to about 0.3 hydroxyl equivalent multiplied by the number of methoxyl equivalents (ASTM D–1166–60) in the residue to that quantity of ethylene glycol in moles substantially equal to the moles of potassium hydroxide needed for the drastic saponification (Anal. Chem. 23, 1126 (1951)) of the residue.

Reaction is effected by admixing the residue with ethylene glycol preferably in excess of the quantity to be reacted with the residue, and establishing and maintaining the resulting mixture in an elevated temperature range for a period of time sufficient for complete reaction. Generally, the DMT esterified oxidate residue has a catalyst content which is also effective for transesterification, and which will promote the present reaction. However, if such a catalyst is not present or not enough of it is present, enough transesterification catalyst to make a catalytic quantity of transesterification catalyst in the mixture is added to the mixture. Any conventional transesterification catalyst (single compound or mixture of compounds) can be used to promote this reaction..

The temperature range in which reaction is effected is generally from about 150 to 250° C. However, lower and higher operable temperatures are within the broader concepts of this invention.

The pressure under which the reaction is carried out is generally atmospheric. However, sub-atmospheric pressure and superatmospheric pressure are within the broader concepts of this invention.

Generally the reaction is performed in the absence of a liquid reaction medium composed of material other than ethylene glycol and DMT esterified oxidate residue. However, the presence of liquid reaction medium composed of material other than the reactants is within the broader concepts of this invention.

The period of time sufficient for complete reaction is generally in a range from about one hour to about ten hours. Of course, the higher the reaction temperature the shorter the time required for substantially complete reaction. Shorter and longer periods of time to effect substantially complete reaction are. within the broader aspects of this invention. Reaction is considered to be substantially complete when the formation of methanol becomes nil.

Preferably, while reaction is taking place, methanol and any water formed in the reaction are removed from the reaction vessel. Any ethylene glycol removed with the methanol is preferably returned to the reaction mixture.

Upon substantial completion of the reaction, residual ethylene glycol preferably is removed from the reaction mixture. This is done by distillation. The residue consists essentially of the desired reaction product.

The reaction product is a thermoplastic synthetic resin. The ranges of typical properties of specific embodiments of the resin are:

| | |
|---|---|
| State at 20–25° C. | Dark brown. |
| Color | Liquid to solid. |
| Drop softening point | 20 to 250° C. |
| Acid number (ASTM D1639) | 0 to 40. |
| Hydroxyl (ASTM E222, Method B) | 0 to 12% by weight. |
| Methoxyl (ASTM D–1166–60) | 0 to 25% by weight. |
| Solubility: | |
| Acetone | Completely soluble, no residue, to partially soluble, residue present, solvent dark in color. |
| Butyl acetate | Partially soluble, residue present, solvent dark in color. |
| Toluene | Do. |
| Methylene chloride | Complete soluble, no residue. |
| Kerosene | Completely insoluble. |

In general, these properties are dependent upon the ethylene glycol moiety content of the reaction product. In this connection, those specific embodiments of the resin in which the ethylene glycol moiety content is in the lower portion of the range have drop softening points higher than the residue from which they are made. However, some embodiments of the resin of this invention in which the ethylene glycol moiety content is in the higher portion of the range have drop softening points the same as, or lower than, the drop softening points of the DMT esterified oxidation residue from which they are made.

The normally solid embodiments of the synthetic resin of this invention have utility as binding resins for fluid laid fiber composites such as, for example, air or water laid wood or mineral fiber board. In such utilities they can be used alone or with thermosetting binder resins, such as, for example, conventional binder phenolic resins. The normally liquid and solid embodiments of the synthetic resin have utility as polyol reactants for reaction with polyisocyanate material (one or more polyisocyanates) to form polyurethane foams, coatings, films and the like.

The best mode now contemplated of carrying out this invention is illustrated by the following examples of specific embodiments thereof. This invention is not limited to these specific embodiments. In the examples all parts are by weight designated by "w," all parts by volume are identified as "v," and w is related to v as the kilogram is to the liter. Also, all percentages are by weight.

EXAMPLE 1

This example illustrates the preparation of a specific embodiment of the synthetic resin of this invention.

DMT esterified oxidate residue (500 w), having such typical properties as drop softening point=40° C.; acid number (ASTM D1639)=20; methoxyl (ASTM D–1166–60)=20%; DMT=4%; and solubilities=completely soluble, no residue, in acetone, butyl acetate, toluene and methylene chloride, and completely insoluble in kerosene, is introduced into a reactor fitted with a stirrer and a fractional distillation column, and heated until fluid enough to stir readily. While stirring the residue, ethylene glycol (115.6 w) is added, and then lead oxide (0.16 w) is added. The resulting mixture is established and maintained for 3.7 hours at 210° C., while a distillate (77.6 w) consisting essentially of methanol and water is removed. Ethylene glycol is returned to the reactor by the fractional distillation column. At the end of the reaction period unreacted ethylene glycol is removed by distillation from the reaction mixture.

The material that remains is a specific embodiment of the synthetic resin of this invention. Typical properties are: drop softening point=131° C.; acid number (ASTM D1639)=5.7; hydroxyl (ASTM E222 Method B)=2.9%; methoxyl (ASTM D–1166–60)=0.8%; DMT=0.1%; and solubilities=partially soluble, residue present, solvent dark in color, in acetone, butyl acetate and toluene, completely soluble, no residue, in methylene chloride, and completely insoluble in kerosene.

This resin is useful as a thermoplastic resin binder for air and water laid wood and mineral fiber composite boards. In such utility, the resin is a substitute in whole or in part for the thermoplastic resin component in conventional formulations with conventional ways and means for making the boards from such formulations. Exemplary disclosures of formulations and procedures are given in the U.S. Pat. 3,386,879, to Yann et al., and the U.S. Pat. 3,113,065, to Newton et al.

As a matter of fact, the foregoing resin contributes sufficient bonding and sizing characteristics to fiber formed structures that they can be used for exterior applications. Also, the foregoing resin is compatible with thermoset phenolic resins to the extent that it can be used with such thermoset phenolic resins in wood and mineral fiber composite boards.

An outstanding advantage of the foregoing resin when used as a binder for exterior boards is its resistance to "bleed through" when primers are applied to the boards' surfaces. Binders currently in commercial use require carefully selected solvent systems for the primers, and very close control of application techniques to minimize "bleed through." Even under the best of conditions, some film softness and staining occur, however. The resin of this example offers solubility characteristics that make for more flexibility in solvent systems and application techniques, and that are favorable for fast production lines.

EXAMPLE 2

This example illustrates the preparation of another specific embodiment of the resin of this invention.

Following the procedure of Example 1, except that lead oxide is not added, a mixture of DMT esterified oxidate residue (400 w) having the same typical properties as the DMT esterified oxidate residue of Example 1, and ethylene glycol (206 w) is established and maintained at 224° C. for a period of 3½ hours. During this period of time a distillate (103 v), consisting essentially of methanol and water, is collected. The reaction mixture is then established and maintained at 224–228° C. for 2½ hours. During this period of time a small amount (5 v) of distillate, consisting essentially of methanol and water, comes over. The reaction mixture is then cooled. It is the desired synthetic resin. Typical properties of this synthetic resin are: drop softening point=66° C.; acid number (ASTM D1639)=2.1; hydroxyl (ASTM E222 Method B)=9.9%; methoxyl (ASTM D–1166–60)=0.23%.

This synthetic resin is useful as polyol reactant for the production of polyurethane foam.

EXAMPLE 3

This example illustrates the use of the specific synthetic resin of Example 2 in the preparation of a flexible polyurethane foam.

A quantity (100 w) of the synthetic resin of Example 2 is melted with a quantity (100 w) of Pluracol PEP 450, an oxypropylated pentaerythritol having an average molecular weight of about 450, and the mixture stirred. A portion (50 w) of the molten blend, L5310 (Union Carbide) silicone surfactant (0.5 w), N,N,N',N'-tetramethyl-1,3-butanediamine (0.5 w) and Freon 11 (monofluorotrichloromethane) blowing agent (15 w) are admixed in a suitable container. Polymethylene polyphenyl diisocyanate (54.8 w, 0.42 equivalent NCO) is added to the container, and the mixture is subjected for about 10 seconds to high shear stirring. The mixture is then quickly poured into a pan and permitted to foam. The result is a polyurethane foam which has the typical properties: density=2.28 pounds per cubic foot; compressive strength=28.7 p.s.i. and compressive modulus=653 p.s.i.

The synthetic resin is also useful as a polyol component for polyurethane coating and film compositions.

Thus, there is provided a new synthetic resin with interesting properties. Its insolubility in aliphatic solvents indicates utility where staining or attack by solvents or mineral oils may be a problem. It is compatible with many types of rubber and vinyl polymers. Hence, it has utility in such polymers as tackifiers, processing and extrusion aids, and extenders.

Other features, advantages and specific embodiments of this invention will become readily apparent to those exercising ordinary skill in the art after reading the foregoing disclosures. Such specific embodiments are within the scope of this invention. Moreover, while a specific embodiment has been described in considerable detail, variations and modifications of this embodiment can be effected without departing from the spirit and scope of the invention as disclosed and claimed.

The term "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

The solubility data herein are based on the test wherein a sample (25 w) of the material to be tested and solvent (75 w) are admixed, the mixture agitated at 20–25° C. for 24 hours, and the solubility observation then made.

The drop softening point data are obtained by the Hercules Drop Softening Point Method. This method is described on page 12 of a booklet titled, "Wood Rosins, Modified Rosins and Related Resins," published in 1963 by Hercules Powder Company, now by change of name Hercules Incorporated. The weight of sample on the thermometer bulb is 0.50–0.55 gram.

The special standard thermometer is a total immersion mercury thermometer having a range of 0 to 250° C. with 1° subdivisions. The bulb is 5/8±1/32 inch long, and 1/4±1/64 inch in diameter.

What I claim and desire to protect by Letters Patent is:

1. The synthetic resin which is the reaction product of DMT esterified oxidate residue and a quantity of ethylene glycol in the range extending from that quantity of ethylene glycol equal to about 0.3 hydroxyl equivalent multiplied by the number of methoxyl equivalents in said residue, to that quantity of ethylene glycol in moles substantially equal to the moles of potassium hydroxide needed for the drastic saponification of said residue.

2. The synthetic resin according to claim 1, which has a drop softening point substantially greater than the drop softening point of said residue.

References Cited

UNITED STATES PATENTS

| | | | |
|---|---|---|---|
| 3,008,934 | 11/1961 | Wielicki et al. | 260—75 |
| 3,223,666 | 12/1965 | Bolton | 260—29.2 |
| 3,197,439 | 7/1965 | Frey | 260—75 |
| 3,248,417 | 4/1966 | Hoffmann et al. | 260—475 |

FOREIGN PATENTS

| | | |
|---|---|---|
| 1,576,132 | 7/1969 | France. |
| 6810742 | 2/1969 | Netherlands. |

MELVIN GOLDSTEIN, Primary Examiner

U.S. Cl. X.R.

117—140 A